United States Patent
Klein et al.

(10) Patent No.: US 9,615,207 B1
(45) Date of Patent: Apr. 4, 2017

(54) METHOD AND APPARATUS FOR CHANGING GEOFENCE BASED RADIO OPERATING PARAMETERS

(71) Applicant: MOTOROLA SOLUTIONS, INC, Schaumburg, IL (US)

(72) Inventors: David E. Klein, Parkland, FL (US); Graeme Peter Johnson, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/963,963

(22) Filed: Dec. 9, 2015

(51) Int. Cl.
 H04W 4/02 (2009.01)
 H04W 4/22 (2009.01)
 H04W 4/08 (2009.01)
 H04W 8/24 (2009.01)

(52) U.S. Cl.
 CPC ............ *H04W 4/022* (2013.01); *H04W 4/02* (2013.01); *H04W 4/021* (2013.01); *H04W 4/08* (2013.01); *H04W 4/22* (2013.01); *H04W 8/245* (2013.01)

(58) Field of Classification Search
 CPC ........ H04W 4/021; H04W 28/18; H04W 4/02
 See application file for complete search history.

(56) References Cited

U.S. PATENT DOCUMENTS

| 2014/0365110 A1 | 12/2014 | Coch et al. | |
| 2016/0054865 A1* | 2/2016 | Kerr | H04L 67/02 715/739 |
| 2016/0358432 A1* | 12/2016 | Branscomb | G08B 13/1965 |

\* cited by examiner

*Primary Examiner* — Asghar Bilgrami

(57) ABSTRACT

A method and apparatus for changing geofence-based operating parameters is provided herein. During operation, all members within a first geofence will have their radio parameters change to those used within a second geofence when a member of the first geofence crosses into the second geofence. Therefore, even though a particular member of the first geofence may not have crossed over the second geofence, the particular member will still have their radio parameters changed to those in use within the second geofence if a member of the first geofence has crossed the second geofence.

8 Claims, 5 Drawing Sheets

METHOD AND APPARATUS FOR CHANGING GEOFENCE BASED RADIO OPERATING PARAMETERS

BACKGROUND OF THE INVENTION

Many public safety or other private or government wireless communication systems provide for group-based radio communications amongst a plurality of radios (subscriber units). During the formation of a group, all radios within the group will share certain radio parameters (e.g., channel, alerts, . . . , etc). In certain situations, important alerts may need to be provided to the group or groups operating in a particular defined area. For example, at a mining site, events such as blasting operations impart unique alerting requirements on the wireless communication system and subscriber devices operating therein in preparation for, and perhaps during, a blasting operation. In other situations, a group or groups of subscriber devices may need to be alerted about events such as hazardous material leaks or weather alerts relative to a particular defined area. Other examples are possible as well.

Typical methods of signaling events such as blasting amongst subscriber units have historically relied upon an assignment of a separate RF channel over which predefined analog audio is mixed at the infrastructure and broadcast from the fixed terminal to the subscriber units, and played back at the subscriber units that are tuned to the separate RF channel, to indicate the respective event or hazard.

However, such typical methods provide a same alert (in this case, an alert tone) across a coverage area of an entire site or group, without an ability to selectively choose a particular alert based on the type of event or hazard, and/or to limit the alert to a particular area within a radio coverage cell of a base station broadcasting the alert. For example, a particular base station may provide wireless communications coverage over a 5 mile radius, but an alert may only be relevant to a one square mile area within the radio coverage cell. Furthermore, a relevant area may cross over two radio coverage cells of two adjacent base stations, in which case the alert may be broadcast over two large radio coverage cells when the alert is only relevant to a small sub-portion at the periphery of each radio coverage cell. Still further, common relevant areas may exist in multiple sub-portions of coverage areas, such as schools or parks. Other examples are possible as well.

In order to address the above, a geofence may be created that defines a particular area of interest. Those units within the geofence may have their radios operate in a similar manner (e.g., all tune to the same channel, all receive the same alerts, . . . , etc.) regardless of the infrastructure equipment being utilized.

Geofences may be mobile. For example, a caravan of users/vehicles may have a geofence created so that everyone within a predetermined distance from a particular vehicle operates in a similar manner. Consider a caravan guarding/carrying the President of the United States. All vehicles within the caravan may be within an established geofence that stretches miles.

A problem exists when geofences cross. When the geofence enables communication management between crossing geofences, this can have an adverse impact on the intra-communication activities of a caravan. Consider the situation where a vehicle, being part of a first geofence caravan, crosses over a second geofence. Should the vehicle change radio parameters? Doing so may effect the vehicle's ability to communicate with others in the caravan who haven't entered the second geofence. Accordingly, what is needed is an improved method and apparatus for changing geofence-based operating parameters for radios without hindering communications with other members of the geofence.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
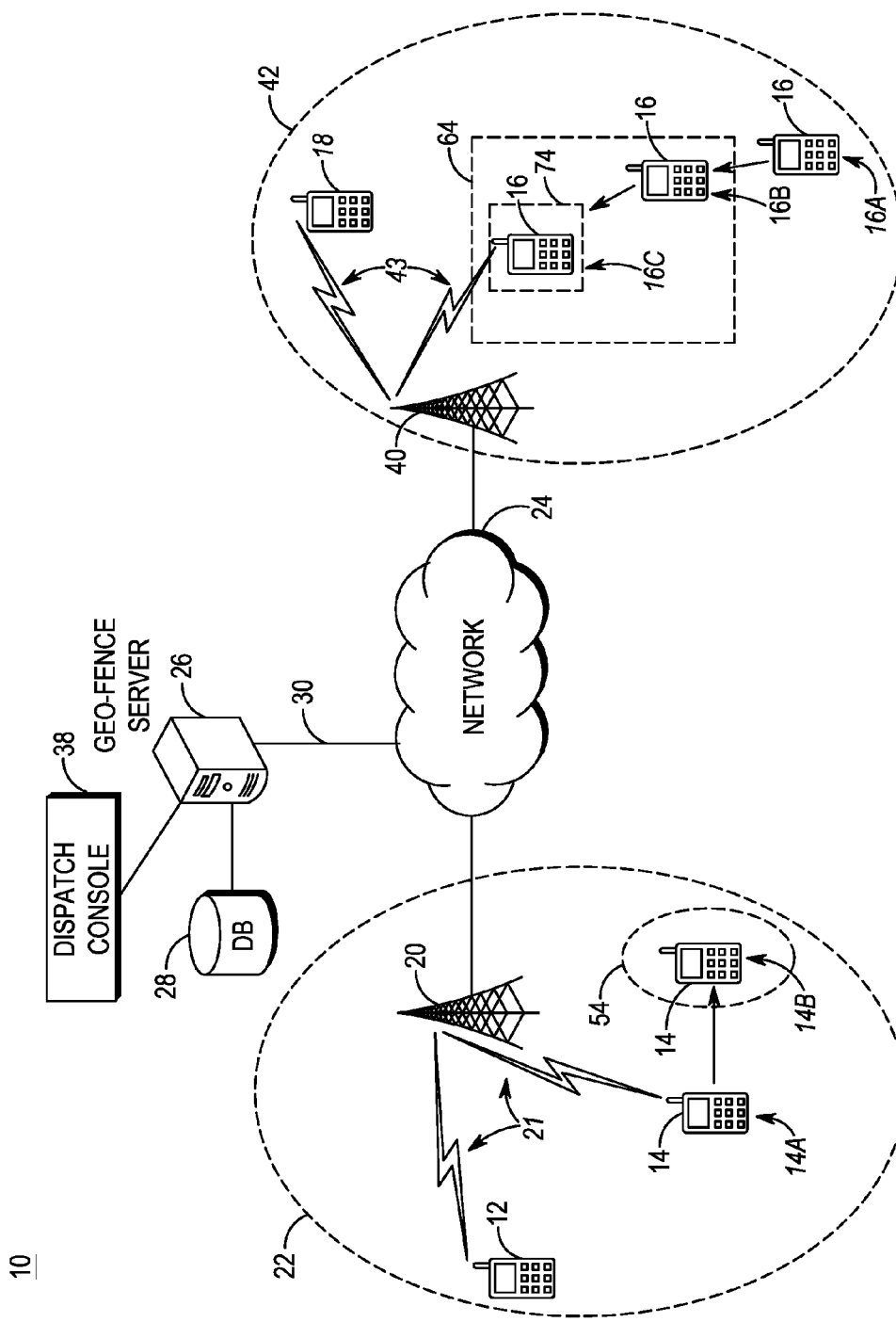
FIG. 1 is a block diagram of a wireless communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In order to address the above-mentioned need, a method and apparatus for changing geofence-based operating parameters is provided herein. During operation, all members within a first group of radios will have their radio parameters change to those used within a second geofence when a member of the first group crosses into the second geofence. Therefore, even though a particular member of the first group may not have crossed over the second geofence, the particular member will still have their radio parameters changed to those in use within the second geofence if a member of the first group has crossed the second geofence.

The description below will be given for the scenario where the first "group" of radios are part of a first geofence that is mobile. However, the first group of radios may not be part of a first geofence. In an alternate embodiment of the present invention the first group of radios may simply be mobile radios that desire to communicate with each other, and operate using similar operating parameters regardless of location. Thus, it is not necessary for the group of radios to be defined by a mobile geofence (also called the "first geofence" in the text). For example let's say that Secret Service "team five" has been assigned to escort the presidential convoy. The radio users could simply log in to a geofence server as team five and then all radios which are part of team five will perform the same geofence related actions as their members cross into a geofence regardless of team-five-members physical location.

Since all radios within the first group (which may be a first geofence) will potentially have their radio parameters change if a radio crosses over a second geofence, all radios within the first group will be able to communicate with each other as radios pass into and out of the second geofence.

Thus, if some radios within a caravan (i.e., radios forming a first group and sharing parameters that allow communications among all radios within the first group, which may form a mobile geofence) are entering a second geofence, all radios within the caravan will have radio parameters of the second geofence propagated to the rest of the caravan even though all radios within the caravan have not crossed the second geofence. Such parameters include, but are not limited to:

Channel change;

Emergency configuration—an emergency mode enabled for elevated privileges. For example moving the radio to a command channel in an emergency;

Voice Announcements/Alerts/Visual mode indicators

Status/Message information shared back to system;

Covert—vehicle operating modes (lights/sirens/etc); and/or

Power level—reduce power when is blasting or hazardous areas.

Note that entry into the second geofence can be defined as a lead vehicle, a last vehicle, or a master vehicle (i.e. middle vehicle or key vehicle) entering the second geofence such that parameters are only propagated when the lead/last/master vehicle enters the second geofence.

There may be conditions that would cause the changes to not be propagated across the caravan. For example:

If reducing power level causes vehicles within the caravan to no longer be able to communicate with each other;

If changing channel/freq/system to something that not all vehicles within the caravan could operate at;

If the second geofence area is smaller than caravan length, or a first geofence area; and/or If all vehicles are within the first geofence are not within the second geofence.

Configurations changes for radios within the first caravan could propagated to all radios within the caravan as follows:

First-in-first-out (FIFO)—when a first member within the caravan enters the second geofence, and until the first member of the caravan leaves the second geofence;

First-in-last-out (FILO)—when a first member within the caravan enters the second geofence, and until the last member of the caravan leaves the second geofence;

Last-in-last-out (LILO)—when a last member within the caravan enters the second geofence, and until the last member of the caravan leaves the second geofence;

Master—when a master member within the caravan enters the second geofence, and until the master member of the caravan leaves the second geofence.

FIG. 1 illustrates a communications network 10 including client radios (subscriber devices) 12, 14, 16, 18, fixed terminals 20, 40 (e.g. base stations), wireless links 21, 43, backhaul network 24, geofence server 26, database 28, communications connections 30, 32, 36, and dispatch console 38. Each base station 20, 40 has at least one radio transmitter covering a radio coverage cell (22, 42). One or several radios 12, 14, 16, 18 within radio coverage cells 22, 42 of the respective base stations 20, 40 may connect to the base stations 20, 40 using a wireless communication protocol via respective wireless links 21, 43. The radios 12, 14, 16, 18 may communicate with each other, and perhaps other devices accessible via other network links, using a group communications protocol over wireless links 21, 43. Wireless links 21, 43 may be, for example, a wireless link supporting a protocol such as GPRS or UMTS, 2G, (e.g. GSM), 3G (e.g. WCDMA or LTE), iDEN, wireless LAN (WLAN), or ETSI Digital Mobile Radio (DMR), among other possibilities. The radios 12, 14, 16, 18 may be configured with an identification reference (such as an IMSI, International Mobile Subscriber Identity, or an SUID, Subscriber Unit Identifier) which may be connected to a physical media (such as a SIM card, Subscriber Identity Module).

Each radio 12, 14, 16, 18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single radio, such as radio 14, to communicate with one or more members (such as radios 12, 16-18) associated with a particular group of radios at the same time. Radios 12, 14, 16, 18, base stations 20, 40, and/or an infrastructure controller (not shown) may cooperate to define groups of radios and enable the one-to-many communications feature provided by communications network 10. As radios are mobile, they may move within, into, out of, and/or between radio coverage cells 22, 42. For example, radio 14 may move from an initial location 14A within radio coverage cell 22 to a subsequent location 14B also within radio coverage cell 22. Similarly, radio 16 may move from an initial location 16A outside of radio coverage cell 42 to a secondary location 16B within radio coverage cell 42, and then to a final location 16C also within radio coverage cell 42.

Although only four radios and two base stations are illustrated in FIG. 1, the present disclosure is not limited as such, and more or fewer radios and more or fewer base stations could be used in any particular implementation. Furthermore, while a single geofence server 26 is illustrated in FIG. 1, more than one geofence server 26 may be used and/or a distributed geofence server 26 may be used that divides functions across multiple devices, perhaps for load balancing reasons. Finally, while database 28 is illustrated as directly coupled to geofence server 26, database 28 may also be remote from geofence server 26 and accessible to geofence server 26 via one or more of network 24 and/or external networks 34.

The base stations 20, 40 may be linked to the geofence server 26 via network 24 and communications connection 30. Network 24 may comprise one or more routers, switches, LANs, WLANs, WANs, access points, or other network infrastructure. For example, geofence server 26 may be accessible to base stations 20, 40 via a dedicated wireline or via the Internet. In one example, base stations 20, 40 may be directly coupled to geofence server 26 via one or more internal links under control of a single communications network provider.

Geofence server 26 may be a separate device or may lie internal other network equipment. Server 26 is configured to maintain a database of geofences and groups of radios desiring communications with each other. As mentioned above, a radio group maintained by server 26 may not necessarily be within a geofence. The groups/geofences maintained are within one or more radio coverage cells of one or more base stations with which it is associated, and may provide mechanisms and/or interfaces for activating or de-activating existing geofences and groups it is maintaining, for adding new geofence/group definitions, and for deleting existing geofence/group definitions. Geofence server 26 may also comprise an application running at the dispatch center (dispatch console 38). The geofence server 26 may further maintain mappings that identify, for each active geofence in the database, a corresponding assigned radio configuration (e.g., an alert for playback by a radio when the radio enters or otherwise finds itself within the geofence). The geofence server 26 may further provide mechanisms and/or interfaces for modifying assigned radio parameters in the mapping, for adding a new mapping that assigns an existing geofence definition to associated radio parameters, and for removing an existing mapping. In other embodiments, geofence server 26 may be embodied within or coupled to another network device, such as a base station controller (BSC), mobile switching center (MSC), site controller, zone controller, Push-to-Talk controller, or other network device, inside network 24 or outside of network 24.

Geofence server 26 may be fed location updates for all radios and propagate radio parameters to the radios based on their location within one or more geofences. In another embodiment, server 26 may simply provide geofence radio parameters and boundary information to each radio, and have the radios themselves change parameters as necessary.

Database 28 may function to store geofence and group definitions, radio parameters for each geofence/group, and mappings and provide them, upon request, to geofence server 26. For example, database 28 may store a first geofence definition (area of operation and radio parameters) defining a first geofence 54 within radio coverage cell 22 and associated with base station 20, a second geofence definition defining a second geofence 64 that is partially within radio coverage cell 42 and associated with base station 42 (and perhaps another, adjacent base station, not shown), and a third geofence definition defining a third geofence 74 that is within (e.g,. a sub-region of) geofence 64 and radio coverage cell 42 and is also associated with base station 40. Server 26 may also store group parameters for those radios not necessarily within a geofence, but desire communications among the radios. Geofence definitions may include a set of three or more polygon vertices, where each polygon vertex is a GPS coordinate, such as latitude and longitude pair, or some other form of cartographic definition. Additionally or alternatively, geofence definitions may include a point and radius, where the radius is a distance criterion and the point is a GPS coordinate (which may be in motion), such as a latitude and longitude pair, or some other form of cartographic definition. Further, geofence definitions may include of a set of two diagonally opposing rectangular vertices, where each rectangular vertex is a GPS coordinate (which may be in motion), such as a latitude and longitude pair, or some other form of cartographic definition. Other possibilities exist as well.

The term 'talk group' is used in this specification to refer to a group of radio's. The term is not intended to be limited to voice communications, but rather, to embody all possible group communications payloads, including but not limited to, voice, data, video, audio, audio/video, images, and/or any other type of media stream.

Furthermore, while the terms "group call" and "talk group" are used throughout the specification to refer to group call examples in a one-to-many group communication structure, in each example, the same or similar considerations can be applied to "group sessions" and "session groups," respectively, when exchanging multimedia messages between group members. Such multimedia messages may include, but not be limited to, video, audio, audio/video, images, and any other type of media stream. Furthermore, the one-to-many group communication structure may utilize any one or more messaging protocols, including unicast, multicast, broadcast, or any combination thereof.

Communications system 10 may implement, in one embodiment, a narrow-band trunked radio communication system in which radios 12, 14, 16, 18 transmit control and data messages in accordance with an air interface protocol such as that defined by the ETSI Digital Mobile Radio (DMR), Terrestrial Trunked Radio (TETRA), or Association of Public-Safety Communications Officials 25 (APCO P25) standards. In a trunked radio communication system, frequencies are assigned for talk group use on an as-needed basis, and signaling over a control channel is used to direct radios to a particular channel to receive a particular group communication. In another embodiment, communications system 10 may implement a PTT over Cellular (OMA-PoC) or PTT over IP (PoIP) broadband architecture in which radios 12, 14, 16, 18 transmit control and data messages in accordance with a protocol such as real-time transport protocol (RTP) and/or session initiation protocol (SIP). Other possibilities exist as well.

Dispatch console 38 lies within a dispatch center (not shown) and may be directly coupled to geofence server 26 as shown, or may be indirectly coupled to geofence server 26 via one or more of network 24 and external networks 34. The dispatch console 38 may provide an administrative or dispatch access to radios 12, 14, 16, 18 and geofence server 26, and allow an administrator or dispatcher to initiate infrastructure-sourced group communications to groups of radios 12, 14, 16, 18, among other features and functions.

Figure 2:
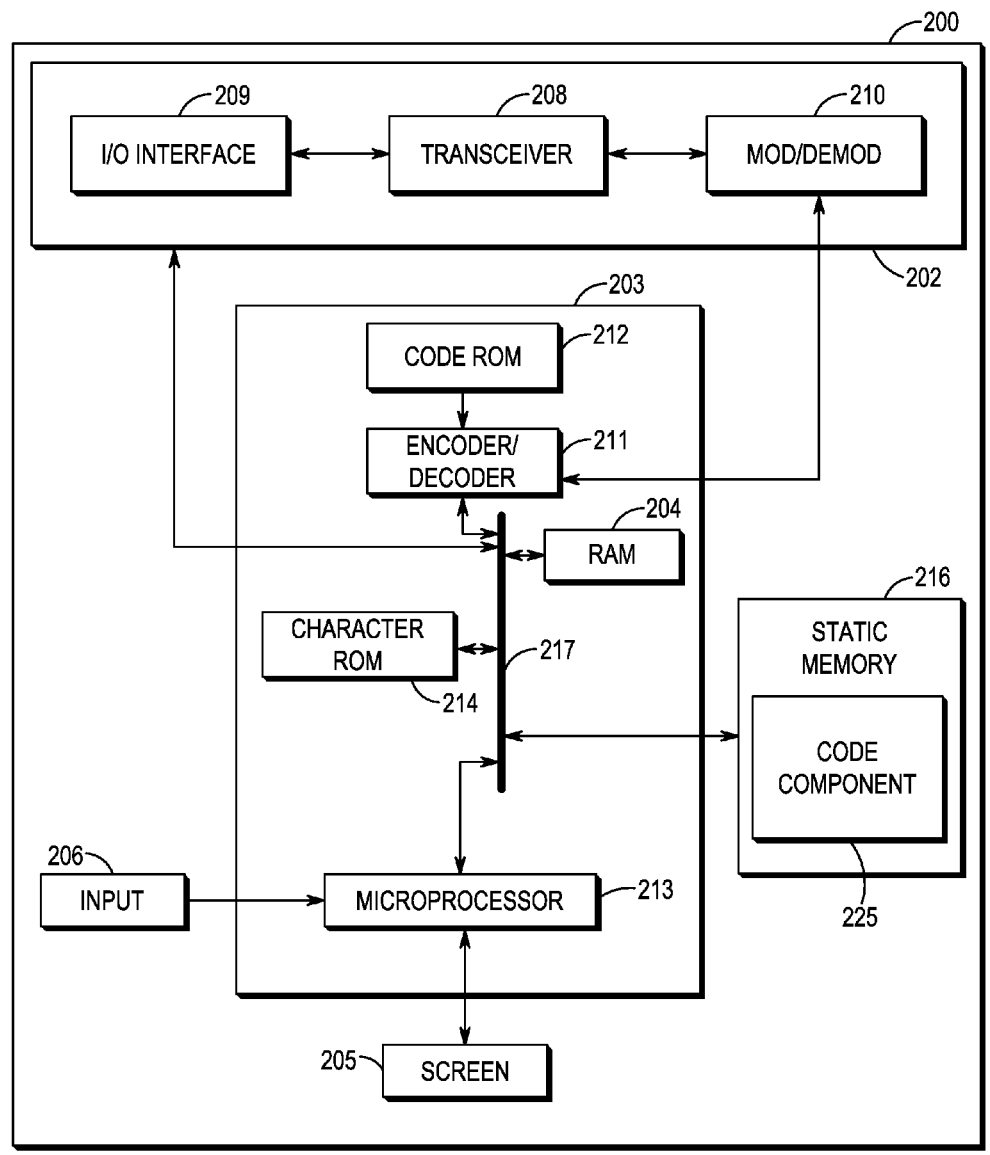
FIG. 2 is a block diagram of a geofence server in accordance with some embodiments.

Referring to FIG. 2, a schematic diagram illustrates a geofence server 200 according to some embodiments of the present disclosure. Geofence server 200 may be, for example, the same as or similar to the geofence server 26 of FIG. 1. As shown in FIG. 2, geofence server 200 includes a communications unit 202 coupled to a common data and address bus 217 of a processing unit 203. The geofence server 200 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals transmitted or received by geofence server 200. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 20, 40 of FIG. 1, with other devices in the communications network 10, and/or with the dispatch console 38. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the geofence server 200. Static memory 216 may store operating code 225 for the microprocessor 213 that, when executed, performs one or more of the steps described with respect to changing radio parameters. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

FIG. 2 shows an apparatus in the form of a server. The apparatus comprises a database 28 having first operating parameters for use with a first group of radios (in this particular example, a first geofence) and second operating parameters for use with a second geofence, and wherein the first geofence comprises a first plurality of radios operating using the first operating parameters, wherein the first geofence is in motion, and wherein the second geofence comprises a second plurality of radios operating using the second operating parameters. A processor 213 is provided that determines if a radio from the first plurality of radios has crossed the second geofence. A transceiver 208 is provided to send instructions to the first plurality of radios to change operating parameters to the second operating parameters based on the fact that the radio from the first plurality of radios has crossed the second geofence.

Figure 3:
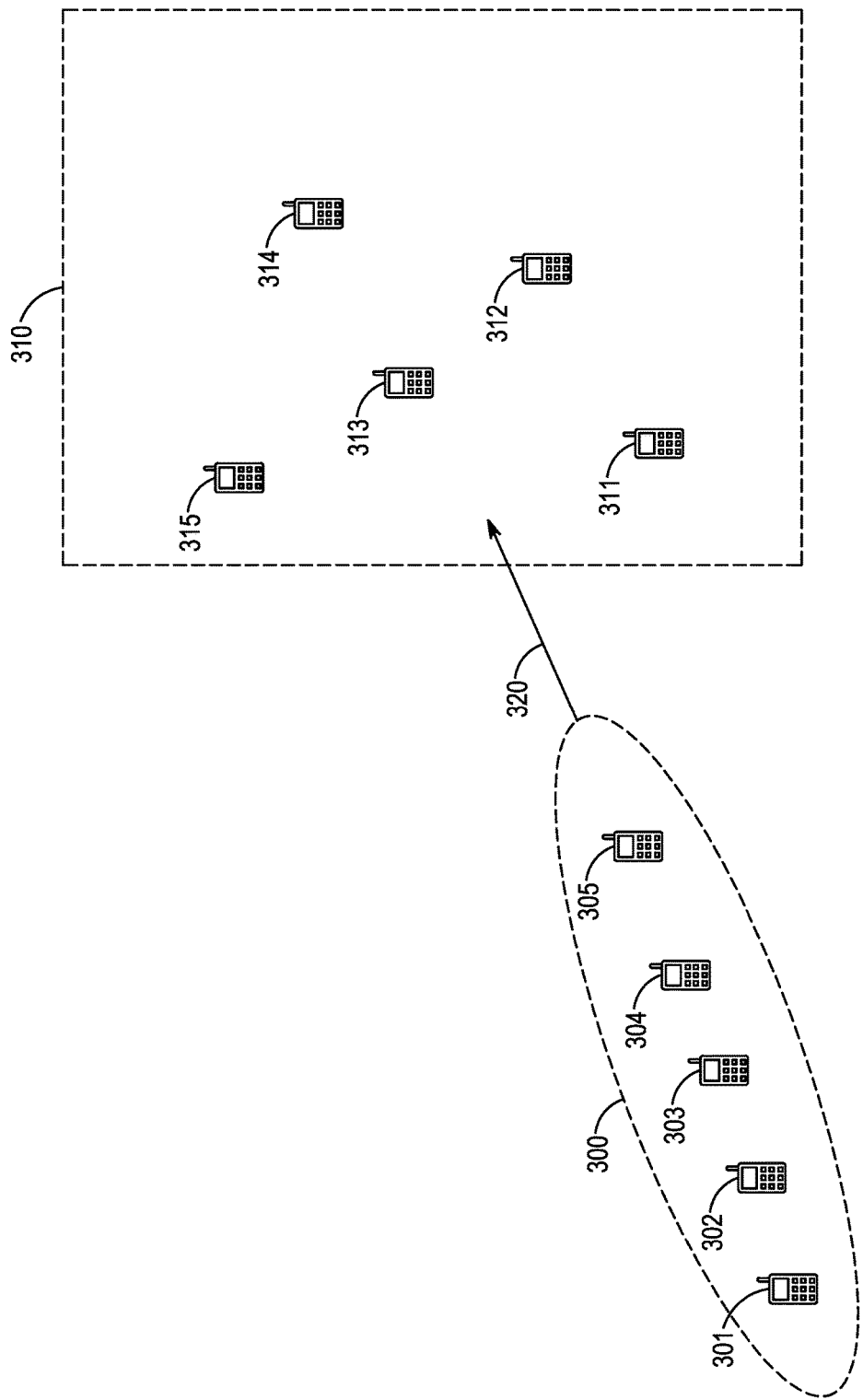
FIG. 3 illustrates a geofence in motion.

FIG. 3 illustrates a moving group of radios. In this particular example, a geofence is shown to illustrate the crossing of geofence boundaries. As shown two geofences exist, namely geofence 300 and geofence 310. In this particular example, geofence 300 is in motion while geofence 310 may or may not be in motion. As shown, geofence 300 has radios 301-305 within its boundaries, all operating using first radio parameters (e.g., a first talkgroup). Geofence 310 has radios 311-315 within its boundaries, all operating using second radio parameters (e.g., a second talkgroup).

Geofence 300 is moving in the direction of arrow 320, and may comprise all those radios within, for example, a certain distance from radio 303. As is evident, radio 305 will cross geofence 310 first. Radio 305 will also be the first to leave geofence 310. Radios 301-305 may have their parameters change as follows:

First-in-first-out (FIFO)—When radio 305 enters geofence 310, all radios 301-305 may change their operating parameters to the second operating parameters. When radio 305 exits geofence 310, all radios 301-305 may change their operating parameters back to the first operating parameters.

First-in-last-out (FILO)—When radio 305 enters geofence 310, all radios 301-305 may change their operating parameters to the second operating parameters. When radio 301 exits geofence 310, all radios 301-305 may change their operating parameters back to the first operating parameters.

Last-in-last-out (LILO)—When radio 301 enters geofence 310, all radios 301-305 may change their operating parameters to the second operating parameters. When radio 301 exits geofence 310, all radios 301-305 may change their operating parameters back to the first operating parameters.

Master—A particular radio (e.g., radio 303) may be identified as a "master" radio. When radio 303 enters geofence 310, all radios 301-305 may change their operating parameters to the second operating parameters. When radio 303 exits geofence 310, all radios 301-305 may change their operating parameters back to the first operating parameters.

As mentioned above, certain conditions may exist that may prevent radios within geofence 300 from changing operating parameters even though they cross geofence 310.

Figure 4:
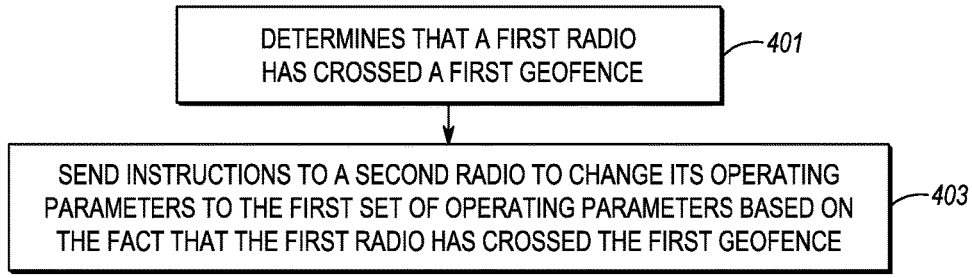
FIG. 4 is a flow chart showing operation of the geofence server of FIG. 2.

FIG. 4 is a flow chart showing operation of the geofence server of FIG. 2. More particularly, FIG. 4 shows those steps (not all necessary) for changing radio operating parameters. The logic flow begins at step 401 where microprocessor 213 determines that a first radio has crossed a first geofence, wherein radios within the first geofence operate using a first set of operating parameters. As discussed above, microprocessor maintains geofences, and is provided periodic updates of radio locations. This information is used to determine when to send out instructions to change radio parameters.

The logic flow continues to step 403 where microprocessor 213 instructs transceiver 208 to send instructions to a second radio to change its operating parameters to the first set of operating parameters based on the fact that the first radio has crossed the first geofence.

As discussed above, the first radio and the second radio may be within a second geofenced area that is in motion, or may simply form a group of radios in communications with each other using similar operating parameters (e.g., talkgroup). Additionally, the first radio, the second radio, and other radios may form a plurality of radios that are within the second geofenced area that is in motion, and wherein one of the following occurs:

when any radio from the plurality of radios enters the first geofenced area, all radios within the plurality of radios are sent instructions to change their operating parameters to the first set of operating parameters;

when all radios from the plurality of radios are within the first geofenced area, all radios within the plurality of radios are sent instructions to change their operating parameters to the first set of operating parameters; and when a master radio from the plurality of radios enters the first geofenced area, all radios within the plurality of radios are sent instructions to change their operating parameters to the first set of operating parameters.

Also, as discussed above, when any radio from the plurality of radios leaves the first geofenced area, all radios within the plurality of radios change their operating parameters to a second set of operating parameters;

when all radios from the plurality of radios leave the first geofenced area, all radios within the plurality of radios change their operating parameters to the second set of operating parameters; and when a master radio from the plurality of radios leaves the first geofenced area, all radios within the plurality of radios change their operating parameters to the second set of operating parameters.

Figure 5:
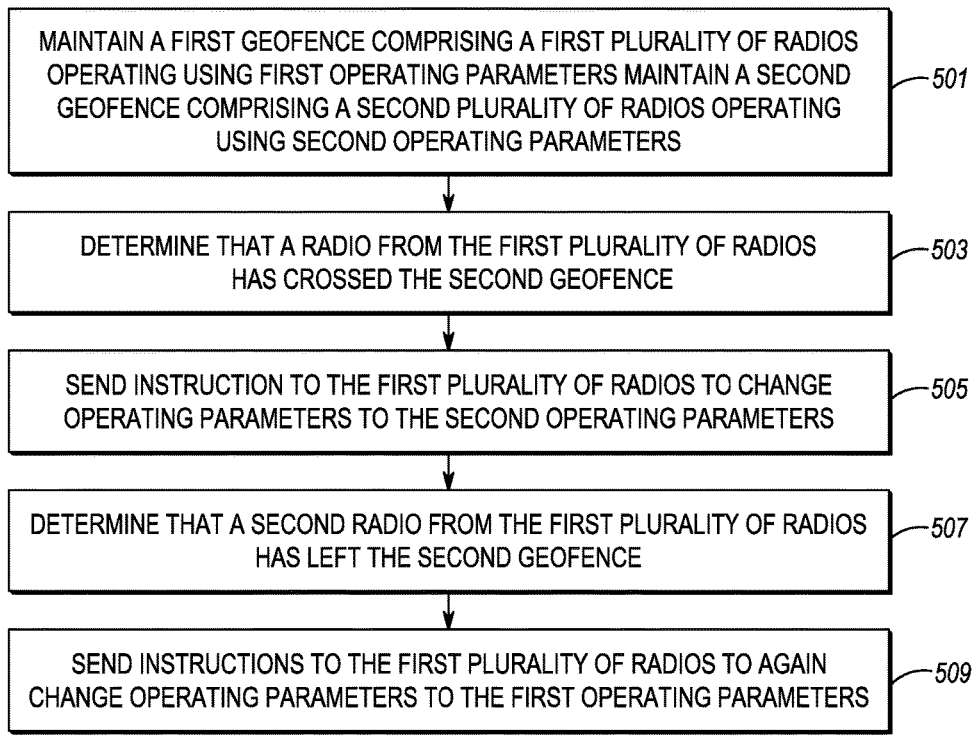
FIG. 5 is a flow chart showing operation of the geofence server of FIG. 2.

FIG. 5 is a flow chart showing operation of the geofence server of FIG. 2. The logic flow begins at step 501 where microprocessor 213 maintains a first geofence comprising a first plurality of radios operating using first operating parameters, wherein the first geofence is in motion. At step 501 microprocessor 213 also maintains a second geofence comprising a second plurality of radios operating using second operating parameters. At step 503 microprocessor 213 determines that a radio from the first plurality of radios has crossed the second geofence, and sends instructions (step 505) to the first plurality of radios to change operating parameters to the second operating parameters based on the fact that the radio from the first plurality of radios has crossed the second geofence.

As discussed above, the radio from the first plurality of radios may be a first radio from the first plurality of radios to cross the second geofence, may be a last radio from the first plurality of radios to cross the second geofence, or may be a master radio and is neither the first radio out of the first plurality of radios or the last radio from the first plurality of radios to cross the second geofence.

At 507 microprocessor 213 determines that a second radio from the first plurality of radios has left the second geofence and sends instructions (step 509) to the first plurality of radios to again change operating parameters to the first operating parameters based on the fact that the second radio from the first plurality of radios has left the second geofence.

As discussed above, the second radio from the first plurality of radios may be a first radio from the first plurality of radios to leave the second geofence, may be a last radio from the first plurality of radios to cross the second geofence, or may be defined as a master radio and is neither the first radio out of the first plurality of radios or the last radio from the first plurality of radios to cross the second geofence.

Figure 6:
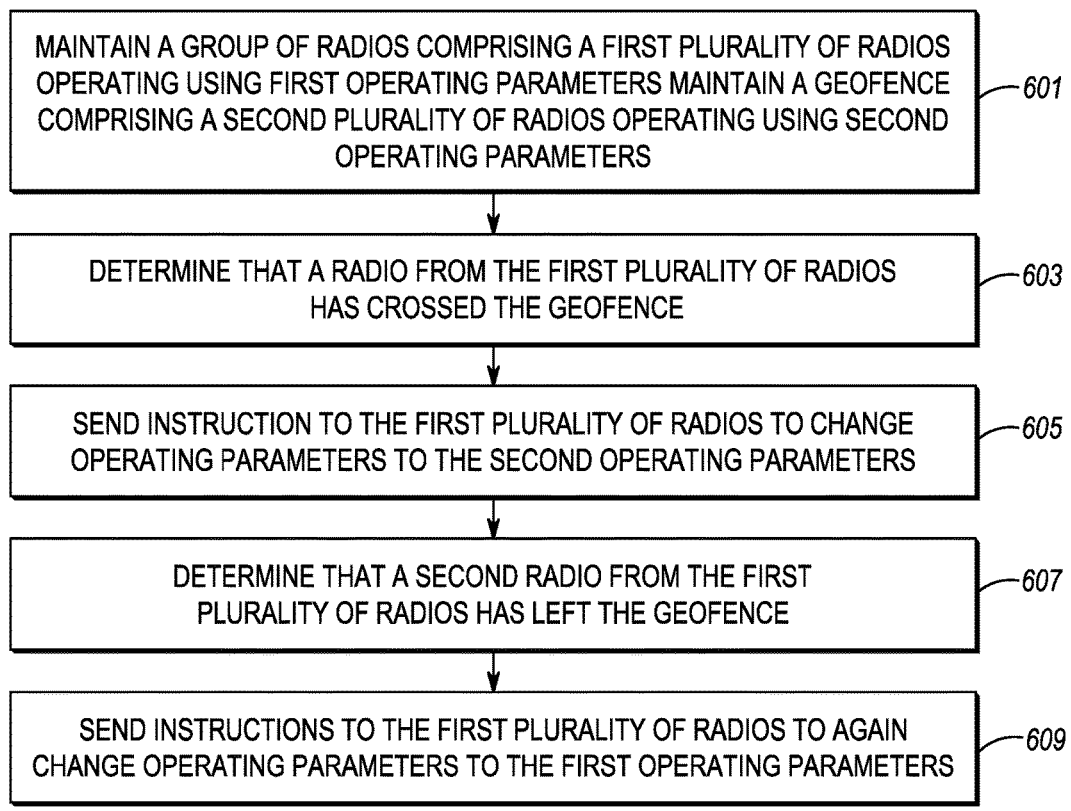
FIG. 6 is a flow chart showing operation of the geofence server of FIG. 2.

FIG. 6 is a flow chart showing operation of the geofence server of FIG. 2. In this example, microprocessor 213 maintains a first group of radios in communication with each other, but not forming a first geofence. The logic flow begins at step 601 where microprocessor 213 maintains a first plurality of radios comprising radios operating using first operating parameters, wherein at least one member from the first plurality of radios is in motion. At step 601 microprocessor 213 also maintains a geofence comprising a second plurality of radios operating using second operating parameters. At step 603 microprocessor 213 determines that a radio from the first plurality of radios has crossed the geofence, and sends instructions (step 605) to the first plurality of radios to change operating parameters to the second operating parameters based on the fact that the radio from the first plurality of radios has crossed the geofence.

As discussed above, the radio from the first plurality of radios may be a first radio from the first plurality of radios to cross the geofence, may be a last radio from the first plurality of radios to cross the geofence, or may be a master radio and is neither the first radio out of the first plurality of radios or the last radio from the first plurality of radios to cross the geofence.

At 607 microprocessor 213 determines that a second radio from the first plurality of radios has left the geofence and sends instructions (step 609) to the first plurality of radios to again change operating parameters to the first operating parameters based on the fact that the second radio from the first plurality of radios has left the geofence.

As discussed above, the second radio from the first plurality of radios may be a first radio from the first plurality of radios to leave the geofence, may be a last radio from the first plurality of radios to cross the geofence, or may be defined as a master radio and is neither the first radio out of the first plurality of radios or the last radio from the first plurality of radios to cross the geofence.

It should be noted that the use of the term "geofence" is envisioned to cover a boundary (similar to a physical fence). However, the term "geofence" can also be thought of as an area, similar to a fenced area. The terms geofence and geofenced area can be used interchangeably. Thus, terms like "crossing a geofence" or "within a geofence" may mean crossing a physical boundary, or within a physical boundary. In a similar manner, the term "leaving a geofence" may mean crossing a physical boundary or simply crossing out of the geofenced area.

The following example illustrates operation of the above-described geofence network 10 is meant to aide in understanding the operation of network 10, and is not meant to limit the invention to any particular mode of operation.

A set of radios log into the geo-fence server via a talkgroup affiliation operation on the LMR network and begin the geo-fence configuration process. This particular affiliation has an associated set of geo-fence definitions along with operating mode details (FIFO, FILO, or LILO) and radio operating parameters.

For the use of geo-fences at a mining territory, a caravan carrying processed ore would begin moving across the managed property while the system monitors the location of the radio units in reference to each other and the defined geo-fence areas. As the first vehicle enters a blasting area, a top priority geo-fence defines the operational parameters for this area (FILO and the radios reduce power to a lower power and switch to an operating channel in a completely different band as compared to the blasting trigger system). When the last vehicle exits that geo-fence the group would re-evaluate the geo-fence definitions and priorities such that they would process the high priority geo-fence and its configuration information for the caravan.

In the foregoing specification, specific embodiments have been described. However, one of ordinary skill in the art appreciates that various modifications and changes can be made without departing from the scope of the invention as set forth in the claims below. For example, as discussed above, although the above description was given with regards to members of a first geofence (first group of radios) crossing a second geofence, is not necessary for the first group of radios to be within a first geofence. In other words, all radios may be members of a group which could be defined by radios desiring communications with each other, and having a same over the air programming, or local user input (button presses, or menu etc.). For example let's say that Secret Service team five has been assigned to escort the presidential convoy. The radio users could simply log in at the geofence server as team five and then all radios which are part of team five will perform the same geofence related actions as members cross the geofence regardless of their physical location (i.e., team five members need not be part of a geofence). Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for changing radio operating parameters, the method comprising the steps of:
   maintaining a first geofence comprising a first plurality of radios operating using first operating parameters, wherein the first geofence is in motion;
   maintaining a second geofence comprising a second plurality of radios operating using second operating parameters;
   determining that a radio from the first plurality of radios has crossed into the second geofence;
   sending instructions to the first plurality of radios that have not crossed into the second geofence to change operating parameters to the second operating parameters based on the fact that the radio from the first plurality of radios has crossed the second geofence.

2. The method of claim 1 wherein:
   the radio from the first plurality of radios is a first radio from the first plurality of radios to cross the second geofence;
   the radio from the first plurality of radios is a last radio from the first plurality of radios to cross the second geofence;
   the radio from the first plurality of radios is defined as a master radio, and is neither the first radio out of the first plurality of radios or the last radio from the first plurality of radios to cross the second geofence.

3. The method of claim 2 further comprising the step of:
   determining that a second radio from the first plurality of radios has left the second geofence;
   sending instructions to the first plurality of radios to again change operating parameters to the first operating parameters based on the fact that the second radio from the first plurality of radios has left the second geofence.

4. The method of claim 1 wherein:
   the second radio from the first plurality of radios is a first radio from the first plurality of radios to leave the second geofence;
   the second radio from the first plurality of radios is a last radio from the first plurality of radios to cross the second geofence;
   the radio from the first plurality of radios is defined as a master radio, and is neither the first radio out of the first plurality of radios or the last radio from the first plurality of radios to cross the second geofence.

5. An apparatus comprising:
a database comprising first operating parameters for use with a first plurality of radios outside a geofence and second operating parameters for use with the geofence, and wherein the first plurality of radios comprises a first plurality of radios operating using the first operating parameters, and wherein the geofence comprises a second plurality of radios operating using the second operating parameters;
a processor determining that a radio from the first plurality of radios outside the geofence has crossed the geofence;
a transceiver sending instructions to the first plurality of radios that have not crossed the geofence to change operating parameters to the second operating parameters based on the fact that the radio from the first plurality of radios has crossed the geofence.

6. The apparatus of claim 5 wherein:
the radio from the first plurality of radios is a first radio from the first plurality of radios to cross the geofence;
the radio from the first plurality of radios is a last radio from the first plurality of radios to cross the geofence;
the radio from the first plurality of radios is defined as a master radio, and is neither the first radio out of the first plurality of radios or the last radio from the first plurality of radios to cross the geofence.

7. The apparatus of claim 5 wherein:
the processor determines that a second radio from the first plurality of radios has left the geofence;
the transceiver sends instructions to the first plurality of radios to again change operating parameters to the first operating parameters based on the fact that the second radio from the first plurality of radios has left the geofence.

8. The apparatus of claim 7 wherein:
the second radio from the first plurality of radios is a first radio from the first plurality of radios to leave the geofence;
the second radio from the first plurality of radios is a last radio from the first plurality of radios to cross the geofence;
the radio from the first plurality of radios is defined as a master radio, and is neither the first radio out of the first plurality of radios or the last radio from the first plurality of radios to cross the geofence.

* * * * *